(12) United States Patent
Wu et al.

(10) Patent No.: US 12,197,088 B2
(45) Date of Patent: Jan. 14, 2025

(54) ARRAY SUBSTRATE, LIQUID CRYSTAL DISPLAY PANEL, AND DISPLAY DEVICE HAVING TRAPEZOIDAL SHAPED ELECTRODE

(71) Applicant: WUHAN CHINA STAR OPTOELECTRONICS TECHNOLOGY CO., LTD., Wuhan (CN)

(72) Inventors: Yunfei Wu, Wuhan (CN); Yongkai Li, Wuhan (CN); Cong Tan, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/635,839

(22) PCT Filed: Feb. 10, 2022

(86) PCT No.: PCT/CN2022/075867
§ 371 (c)(1),
(2) Date: Feb. 16, 2022

(87) PCT Pub. No.: WO2023/133954
PCT Pub. Date: Jul. 20, 2023

(65) Prior Publication Data
US 2024/0036403 A1 Feb. 1, 2024

(30) Foreign Application Priority Data
Jan. 12, 2022 (CN) .................... 202210031011.0

(51) Int. Cl.
*G02F 1/1343* (2006.01)
*G02F 1/1335* (2006.01)
*G02F 1/1362* (2006.01)

(52) U.S. Cl.
CPC ...... *G02F 1/1343* (2013.01); *G02F 1/133514* (2013.01); *G02F 1/134363* (2013.01); *G02F 1/134372* (2021.01); *G02F 1/136286* (2013.01)

(58) Field of Classification Search
CPC .................... G02F 1/1343; G02F 1/134309
See application file for complete search history.

(56) References Cited

U.S. PATENT DOCUMENTS

| 2007/0165166 | A1 | 7/2007 | Kawata et al. |
| 2010/0182558 | A1* | 7/2010 | Lu ............... G02F 1/134363 349/141 |
| 2016/0026043 | A1 | 1/2016 | Okazaki et al. |

FOREIGN PATENT DOCUMENTS

| CN | 1696803 A | 11/2005 |
| CN | 101122723 A | 2/2008 |

(Continued)

OTHER PUBLICATIONS

Chinese Office Action issued in corresponding Chinese Patent Application No. 202210031011.0 dated Apr. 17, 2023, pp. 1-9, 21pp.

(Continued)

*Primary Examiner* — Lauren Nguyen
(74) *Attorney, Agent, or Firm* — The Roy Gross Law Firm, LLC; Roy Gross

(57) ABSTRACT

An array substrate includes a first electrode. The first electrode includes first, second, third and fourth side walls and first and second bottom walls. Ends of the third and fourth side walls are connected by the second bottom wall. A shortest distance d1 is from the first bottom wall to the second bottom wall. A distance d2 is from an end of the first side wall away from the second side wall to an end of the third side wall away from the fourth side wall. A distance d3 is from an end of the second side wall away from the first (Continued)

side wall to an end of the fourth side wall away from the third side wall, and $d1<d2$, $d1<d3$.

20 Claims, 14 Drawing Sheets

(56) References Cited

FOREIGN PATENT DOCUMENTS

| | | | |
|---|---|---|---|
| CN | 102253553 | A | 11/2011 |
| CN | 103869555 | A | 6/2014 |
| CN | 105388655 | A | 3/2016 |
| CN | 105892171 | A | 8/2016 |
| CN | 106502009 | A | 3/2017 |
| CN | 107632470 | A | 1/2018 |
| CN | 108333842 | A | 7/2018 |
| CN | 108957873 | A | 12/2018 |
| CN | 109100895 | A | 12/2018 |
| CN | 109188791 | A | 1/2019 |
| CN | 109416489 | A | 3/2019 |
| CN | 112859459 | A | 5/2021 |

OTHER PUBLICATIONS

PCT International Search Report for International Application No. PCT/CN2022/075867, mailed on May 26, 2022, 10pp.
PCT Written Opinion of the International Searching Authority for International Application No. PCT/CN2022/075867, mailed on May 26, 2022, 9pp.

\* cited by examiner

ARRAY SUBSTRATE, LIQUID CRYSTAL DISPLAY PANEL, AND DISPLAY DEVICE HAVING TRAPEZOIDAL SHAPED ELECTRODE

CROSS REFERENCE TO RELATED APPLICATIONS

This application is a National Phase of PCT Patent Application No. PCT/CN2022/075867 having International filing date of Feb. 10, 2022, which claims the benefit of priority of Chinese Application No. 202210031011.0 filed on Jan. 12, 2022. The contents of the above applications are all incorporated by reference as if fully set forth herein in their entirety.

FIELD OF INVENTION

The present application relates to the field of virtual reality technologies, and more particularly to a to an array substrate, a liquid crystal display panel, and a display device.

BACKGROUND OF INVENTION

The development of virtual reality (VR) technology in display technology is relatively competitive. A display panel of a VR display device has higher response speed and higher resolution (generally around 1000 PPI). At present, electrodes of the display panel of the VR display device are comb-shaped, and a better response time can be obtained. However, a transmittance of comb electrodes is relatively low.

Technical Problem

The transmittance of the comb electrodes is relatively low.

SUMMARY OF INVENTION

In view of this, the present application provides an array substrate with better response time and higher transmittance.

The present application further provides a liquid crystal display panel including the above electrode.

The present application further provides a real display device including the above-mentioned liquid crystal display panel.

In order to solve the above-mentioned problems, the technical solutions provided by the present application are as follows:

An array substrate comprises a driving circuit layer and a first electrode located on the driving circuit layer; wherein the driving circuit layer comprises a plurality of scan lines and a plurality of data lines; wherein an extension direction of the scan lines is defined as a first direction, and an extension direction of the data lines as a second direction, the second direction is perpendicular to the first direction; wherein the first electrode further comprises a solid part; wherein the solid part further comprises:

a first side wall, a second side wall, and a first bottom wall; an end of the first side wall and an end of the second side wall are connected by the first bottom wall; and
 a third side wall, a fourth side wall, and a second bottom wall; an end of the third side wall and an end of the fourth side wall are connected by the second bottom wall;

wherein a connecting line from an end of the first side wall away from the second side wall to an end of the third side wall away from the fourth side wall and a connecting line from an end of the second side wall away from the first side wall to an end of the fourth side wall away from the third side wall extends along the first direction;

wherein a shortest distance from the first bottom wall to the second bottom wall is defined as d1, a distance from the end of the first side wall away from the second side wall to the end of the third side wall away from the fourth side wall is defined as d2, a distance from the end of the second side wall away from the first side wall to the end of the fourth side wall away from the third side wall is defined as d3, and d1<d2 and d1<d3.

In an optional embodiment of the present application, the first electrode further comprises a cavity located in the solid part, the first side wall, the second side wall, the third side wall, the fourth side wall, the first bottom wall, and the second bottom wall are inner walls of the cavity.

In an optional embodiment of the present application, the solid part further comprises an outer side wall, the outer side wall is arranged around the first side wall, the second side wall, the third side wall, and the fourth side wall, and the outer side wall is the outer wall of the solid part.

In an optional embodiment of the present application, the first electrode is a common electrode.

In an optional embodiment of the present application, the first electrode is a pixel electrode.

In an optional embodiment of the present application, an angle between the connecting line between the end of the first side wall connected to the first bottom wall and the end of the third side wall connected to the second bottom wall and the first direction is greater than 0 degrees.

In an optional embodiment of the present application, an angle between the first side wall and the second direction is defined as a first inclination angle $\theta 1$, an angle between the second side wall and the second direction is defined as a second inclination angle $\theta 2$, an angle between the third side wall and the second direction is defined as a third inclination angle $\theta 3$, an angle between the fourth side wall and the second direction is defined as a fourth inclination angle $\theta 4$, and value ranges of $\theta 1$, $\theta 2$, $\theta 3$, and $\theta 4$ are all 3 degrees to 35 degrees.

In an optional embodiment of the present application, the value ranges of $\theta 1$, $\theta 2$, $\theta 3$, and $\theta 4$ are all 5 degrees to 15 degrees.

In an optional embodiment of the present application, the first side wall is parallel to the fourth side wall, and the second side wall is parallel to the third side wall; $\theta 1$ and $\theta 4$ are the first inclination angles of the first electrode, $\theta 2$ and $\theta 3$ are the second inclination angles of the first electrode; $\theta 1$, $\theta 2$, $\theta 3$, and $\theta 4$ satisfy: $\theta 1=\theta 4$ and $\theta 2=\theta 3$.

In an optional embodiment of the present application, $\theta 1$ is equal to or not equal to $\theta 2$, and $\theta 3$ is equal to or not equal to $\theta 4$.

In an optional embodiment of the present application, $\theta 1 \neq \theta 2$ and $\theta 3 \neq \theta 4$.

In an optional embodiment of the present application, the solid part further comprises:

a first bottom wall, wherein two ends of the first bottom wall are respectively connected with the first side wall and the second side wall; and
 a second bottom wall, wherein two ends of the second bottom wall are respectively connected with the third side wall and the fourth side wall.

In an optional embodiment of the present application, the first bottom wall and the second bottom wall are both planes parallel to the second direction or not parallel to the second direction.

In an optional embodiment of the present application, the first bottom wall and the second bottom wall are both curved surfaces.

In an optional embodiment of the present application, the solid part further comprises:
- a fifth side wall connected to the end of the first side wall away from the second side wall; and
- a sixth side wall, connected to the end of the third side wall away from the fourth side wall;
- an angle between the fifth side wall and the second direction is defined as a fifth inclination angle $\beta 1$, an angle between the sixth side wall and the second direction is a sixth inclination angle $\beta 2$, and value ranges of $\beta 1$ and $\beta 2$ are both 0 degrees to 90 degrees.

In an optional embodiment of the present application, the value ranges of $\beta 1$ and $\beta 2$ are both 45 degrees to 60 degrees.

In an optional embodiment of the present application, the solid part further comprises:
- a seventh side wall connected to the fifth side wall and the sixth side wall, respectively; and
- an eighth side wall connected to the second side wall and the fourth side wall, respectively;
- wherein the eighth side wall and the seventh side wall are located at two ends of the solid part.

In an optional embodiment of the present application, the array substrate further comprises a substrate and a second electrode opposite to the first electrode, the second electrode is located within the driving circuit layer or on the driving circuit layer, the driving circuit layer is located on the substrate, and the second electrode is located between the substrate and the first electrode.

The present application further provides a liquid crystal display panel including liquid crystal and a color filter substrate, the liquid crystal display panel further includes the above-mentioned array substrate, and the liquid crystal is located between the color filter substrate and the array substrate.

The present application further provides a display device comprising the above-mentioned liquid crystal display panel.

Beneficial effect:

In the array substrate, liquid crystal display panel and display device provided by the present application, 1) the shape of the first electrode is designed to have a first waist (composed of a first side wall, a second side wall, and a first bottom wall) and a second waist (composed of the third side wall, the fourth side wall, and the second bottom wall). The shortest distance from the first waist to the second waist is smaller than the distance from the end of the first side wall away from the second side wall to the end of the third side wall away from the fourth side wall and is smaller than the distance from the end of the second side wall away from the first side wall to the end of the fourth side wall away from the third side wall, so as to obtain a fish-like electrode. By changing the shape of the first electrode, the inactive electric field component and the electric field disorder area can be reduced, thereby reducing the area of the display dark area. Thus, the transmittance is improved while taking into account the response time. 2) The included angle between the connecting line of the end of the first side wall close to the second side wall and the end of the third side wall close to the fourth side wall and the first direction is greater than 0 degrees. This makes the first waist asymmetrical with the second waist. This can not only increase the selectable range of the inclination angle of the first electrode, but also avoid the mutual interference area of liquid crystal rotation disorder, reduce dark domains, and improve transmittance. 3) The response time decreases with the increase of the electrode inclination angle and the transmittance first increases and then decreases with the increase of the electrode inclination angle. Therefore, setting the value of the inclination angle of the first electrode between 3 degrees and 35 degrees can not only improve the transmittance of the display panel, but also have a better response time. This meets the needs of VR display devices. 4) When the first electrode provided in the present application is a pixel electrode, the waist of the electrode shrinks. Thus, the distance between two adjacent electrodes is increased, thereby reducing the risk of cross-linking of adjacent electrodes during the exposure and development process.

DESCRIPTION OF DRAWINGS

In order to more clearly describe the technical solutions in the embodiments of the present application, the following will briefly introduce the drawings that need to be used in the description of the embodiments. The drawings in the following description are only some embodiments of the application. For those skilled in the art, without creative work, other drawings can be obtained based on these drawings.

DETAILED DESCRIPTION OF PREFERRED EMBODIMENTS

Figure 1:
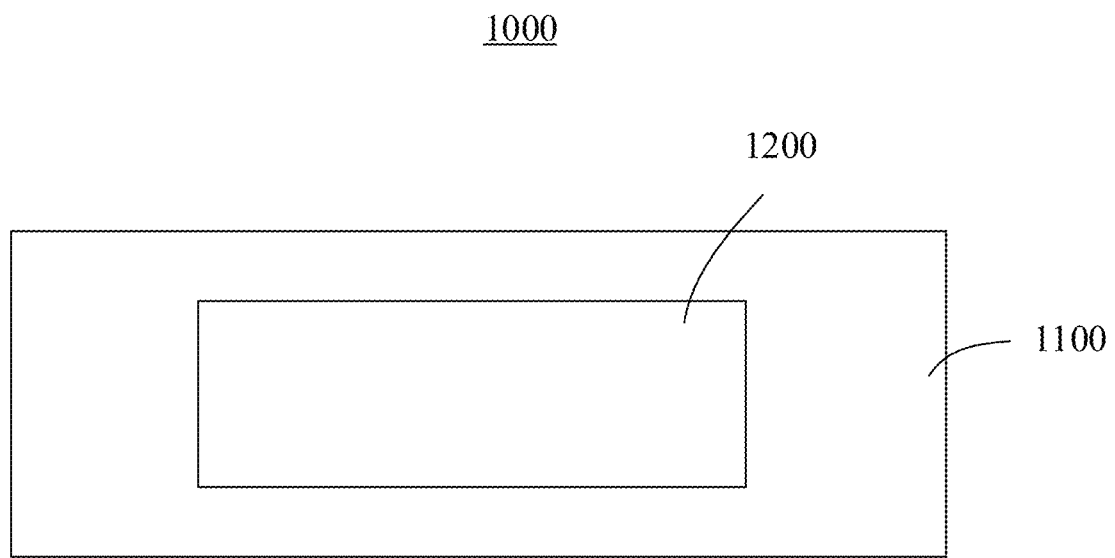
FIG. 1 is a schematic block diagram of a virtual reality display device according to a preferred embodiment of the present application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of the present application, it should be understood that the orientation or positional relationship indicated by the terms "upper", "lower" and the like is based on the orientation or positional relationship shown in the accompanying drawings. This is only for ease of describing the application and to simplify the description. It is not indicated or implied that the referred device or element must have a particular orientation, be constructed and operate in a particular orientation. Therefore, it should not be construed as a limitation on this application. In addition, the terms "first" and "second" are only used for descriptive purposes, and should not be construed as indicating or implying relative importance or implying the number of indicated technical features. Thus, features defined as "first", "second" may expressly or implicitly include one or more of said features. In the description of this application, "plurality" means two or more, unless expressly and specifically defined otherwise.

The application may repeat reference numerals and/or reference letters in different implementations for the purpose of simplicity and clarity and does not in itself indicate a relationship between the various implementations and/or arrangements discussed.

An electrode, a liquid crystal display panel, and a virtual reality display device provided by the present application will be described in detail below with reference to specific embodiments and accompanying drawings.

Referring to FIG. 1, the present application further provides a display device 1000. The display device 1000 includes a liquid crystal display panel 1200 and a main body 1100. The liquid crystal display panel 1200 is disposed on/in the main body 1100.

In an optional embodiment of the present application, the display device 1000 is a virtual reality (VR) display device. It is understood that, in other embodiments, the type of the display device 1000 is not limited to the VR display device.

The liquid crystal display panel 1200 includes an array substrate, a color filter substrate, and liquid crystal, and the liquid crystal is located between the array substrate and the color filter substrate.

The display mode of the liquid crystal display panel 1200 may be one of FFS mode, IPS mode, and VA mode.

In an optional embodiment of the present application, the display mode of the liquid crystal display panel 1200 is the FFS mode. Specifically, the array substrate includes a substrate, a driving circuit layer located above the substrate, and a first electrode and a second electrode formed on the driving circuit layer. The second electrode is located on the driving circuit layer, and the first electrode is opposite to the second electrode. The first electrode and the second electrode are separated by an insulating layer. The first electrode is located above the second electrode. That is, the first electrode is a top electrode, and the second electrode is a bottom electrode.

When the first electrode is a common electrode, the second electrode is electrically connected to the driving circuit layer. When the first electrode is a pixel electrode, the first electrode is electrically connected to the driving circuit layer.

In other embodiments, when the first electrode is a pixel electrode, the second electrode is a common electrode, and the second electrode may also be disposed in the driving circuit layer.

In another optional embodiment of the present application, the display mode of the liquid crystal display panel 1200 is an IPS mode, and the first electrode and the second electrode of the array substrate are both disposed on the driving circuit layer and on the same layer.

In another optional embodiment of the present application, a display mode of the liquid crystal display panel is a VA mode. The first electrode of the array substrate is a pixel electrode and is formed on the driving circuit layer, and the second electrode is located in the color filter substrate.

Specifically, referring to FIG. 2, the structure of the liquid crystal display panel 1200 shown in FIG. 2 will be taken as an example below. The structures of the liquid crystal display panel 1200 and the array substrate 1210 are briefly described.

Figure 2:
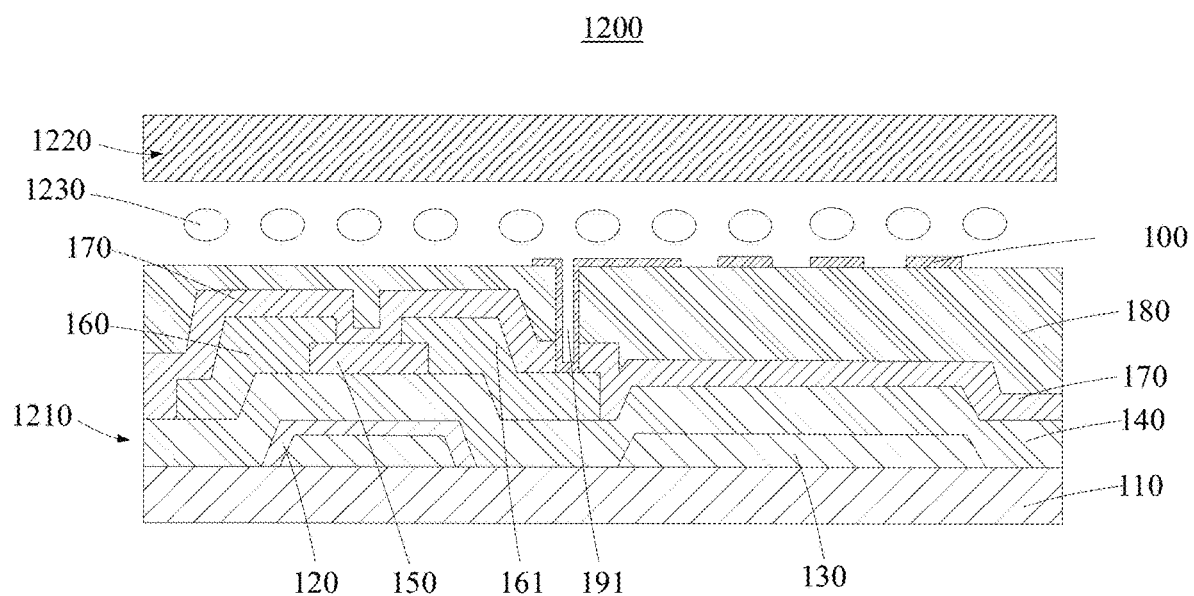
FIG. 2 is a cross-sectional view of a liquid crystal display panel according to a preferred embodiment of the present application.

In FIG. 2, the liquid crystal display panel 1200 includes an array substrate 1210, a color filter substrate 1220, and a liquid crystal 1230, and the liquid crystal 1230 is located between the array substrate 1210 and the color filter substrate 1220.

In FIG. 2, the display mode of the liquid crystal display panel 1200 is the FFS mode. The array substrate 1210 includes a substrate 110, a driving circuit layer located above the substrate 110, a first electrode 100 formed on the driving circuit layer, and a second electrode 130 formed in the driving circuit layer. The first electrode 100 is opposite to the second electrode 130. The first electrode 100 is located above the second electrode 130. The first electrode 100 and the second electrode 130 are insulated. In this embodiment, the first electrode 100 is a pixel electrode.

The driving circuit layer includes a plurality of driving transistors. Each of the driving transistors includes a gate 120 formed on the substrate 110, a gate insulating layer 140 formed on the substrate 110 and covering the gate electrode 120, an active layer 150 formed on the gate insulating layer 140 and opposite to the gate 120, source and drain electrodes 160 formed on the gate insulating layer 140 and are respectively electrically connected to the active layer 150, a passivation layer 170 formed on the gate insulating layer 140 and covering the source and drain electrodes 160 and the active layer 150 exposed from the source and drain electrodes 160, and a planarization layer 180 layer 180 formed on the passivation layer 170. The second electrode 130 is formed on the substrate 110 and covered by the gate insulating layer 140. The first electrode 100 is formed on the planarization layer 180 and is opposite to the second electrode 130.

Figure 3:
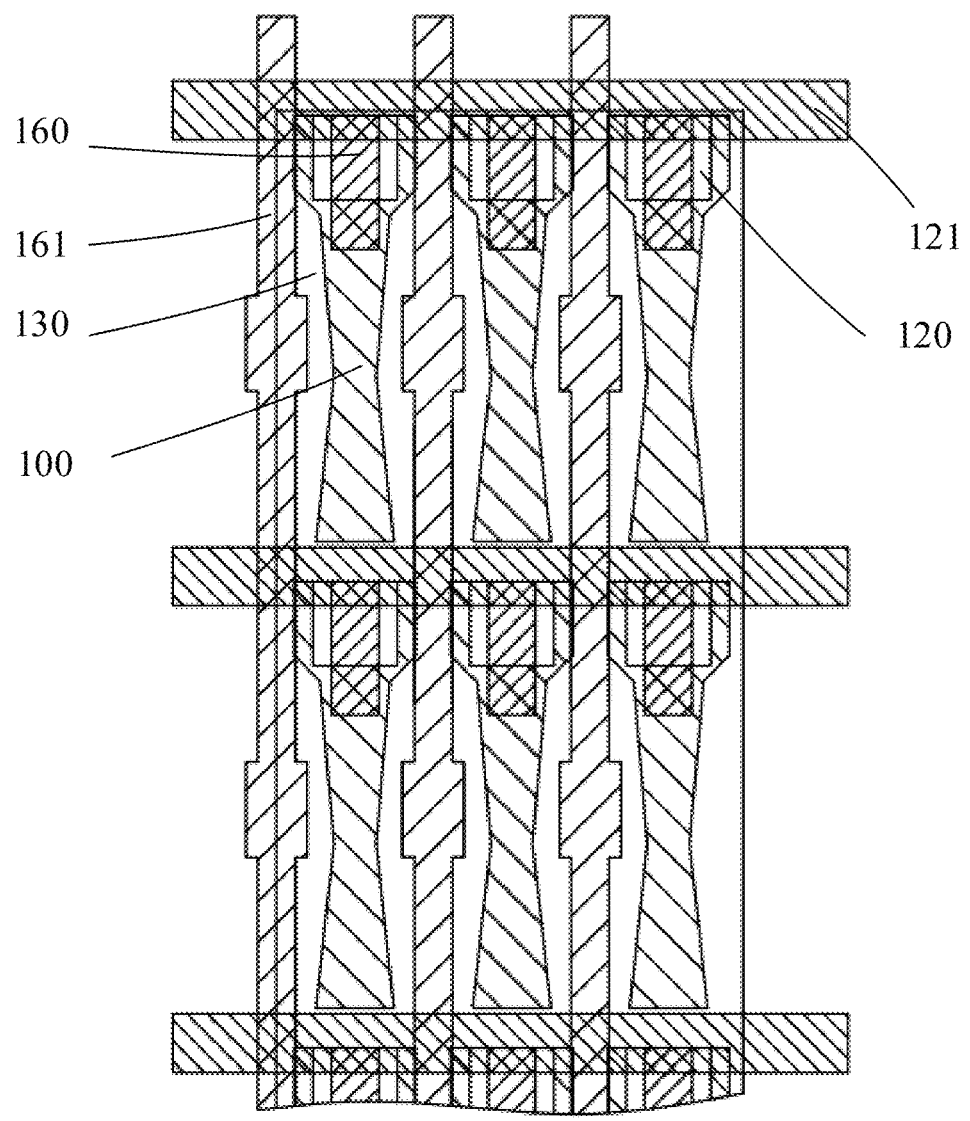
FIG. 3 illustrates a simplified layout diagram of a driving circuit of an array substrate.

Referring to FIG. 3, in this embodiment, the array substrate 1210 further includes a plurality of scan lines 121 and a plurality of data lines 161. The scan lines 121 are disposed in the same layer as the gate electrode 120 and are electrically connected to the gate electrode 120. The data lines 161 are disposed in the same layer as the source and drain electrodes 160 and are electrically connected to the source and drain electrodes 160. The scan lines 121 are used for providing scan signals for the driving transistors, and the data lines 161 are used for providing data signals for the driving transistors. A plurality of scan lines 151 and a plurality of data lines 161 are arranged in an array, the plurality of scan lines 151 are arranged along rows, and the plurality of data lines 161 are arranged along columns. A plurality of sub-pixel areas surrounded by a plurality of scan lines 151 and a plurality of data lines 161. The first electrode 100 is located in the sub-pixel area, the first electrode 100 is a pixel electrode, and the second electrode 130 is a common electrode. The first electrode 100 is positioned opposite to the second electrode 130 to form an electric field for driving the liquid crystal 1230 to deflect.

It can be understood that, in other embodiments, the structure of the array substrate 1210 is not limited to the structure described above.

In this embodiment, the first electrode 100 is shaped like a fish, the second electrode 130 is a sheet electrode, and one of the common electrodes may correspond to one or more pixel electrodes.

The extending direction of the scan lines 121 is defined as the first direction Y1, and the extending direction of the data lines 161 is defined as the second direction Y2.

Figure 4:
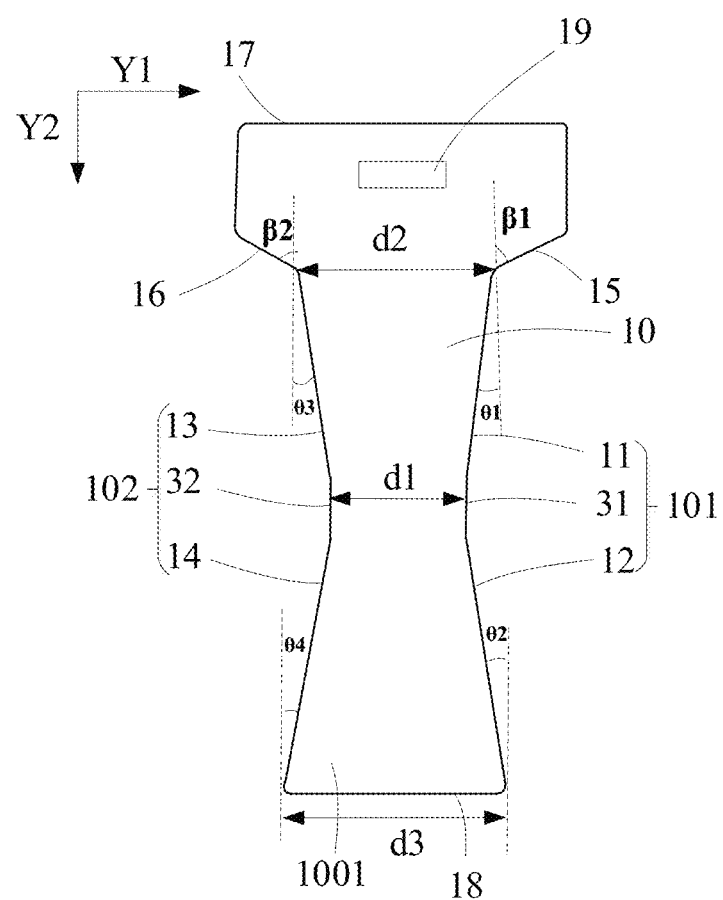
FIG. 4 is a top view of an electrode (pixel electrode) according to a first embodiment of the present application.

Referring to FIG. 4, the first electrode 100 includes a solid part 10. In this embodiment, the first electrode 100 is a pixel electrode, that is, the first electrode 100 only includes the solid part 10.

Specifically, the solid part 10 includes a first surface 1001 and a second surface (not shown) opposite to the first surface 1001. The second surface is in contact with the planarization layer 180. The distance between the first surface 1001 and the second surface is the thickness of the solid part 10 (the first electrode 100).

Specifically, the solid part 10 further includes a first side wall 11, a second side wall 12, a third side wall 13, and a fourth side wall 14. The first side wall 11, the second side wall 12, the third side wall 13, and the fourth side wall 14 are respectively connected to the first surface 1001 and are on different planes from the first surface 1001. One end of the first side wall 11 and the second side wall 12 are connected by the first bottom wall 31 to form the first waist 1001 of the first electrode 100. The third side wall 13 and the fourth side wall 14 are connected by the second bottom wall 32 to form the second waist 102 of the first electrode 100.

A line connecting an end of the first side wall 11 away from the second side wall 12 to an end of the third side wall 13 away from the fourth side wall 14 extends along the first direction Y1. A line connecting the end of the second side wall 12 away from the first side wall 11 to the end of the fourth side wall 14 away from the third side wall 13 extends along the first direction Y1.

A shortest distance d1 from the first waist 1001 to the second waist 102 is defined as d1, a distance from an end of the first side wall 11 away from the second side wall 12 to an end of the third side wall 13 away from the fourth side wall 14 is defined as d2, a distance from an end of the second side wall 12 away from the first side wall 11 to an end of the fourth side wall 14 away from the third side wall 13 is defined as d3, and d1<d2 and d1<d3.

d2 may or may not be equal to d3. In this embodiment, d2 is equal to d3.

In this embodiment, the first bottom wall 31 and the second bottom wall 32 are planes parallel to each other.

Specifically, in an optional embodiment of the present application, the first bottom wall 31 and the second bottom wall 32 extend along the second direction Y2, respectively. Further, the shortest distance d1 from the first waist 1001 to the second waist 102 is the vertical distance between the first bottom wall 31 and the second bottom wall 32.

Specifically, in another optional embodiment of the present application, the first bottom wall 31 and the second bottom wall 32 are parallel, and the first bottom wall 31 and the second bottom wall 32 do not extend along the second direction Y2.

In an optional embodiment of the present application, the first side wall 11 and the third side wall 13 are left-right symmetrical.

In an optional embodiment of the present application, the second side wall 12 and the fourth side wall 14 are left-right symmetrical.

In this embodiment, the connection between the first side wall 11, the second side wall 12, and the first bottom wall 31 and the connection between the third side wall 13, the fourth side wall 14, and the second bottom wall 32 are smooth connections. That is, intersections of the first side wall 11, the second side wall 12, and the first bottom wall 31 and intersections of the third side wall 13, the fourth side wall 14, and the second bottom wall 32 do not form a sharp corner.

It can be understood that in other embodiments, if the process allows, intersections of the first side wall 11, the second side wall 12, and the first bottom wall 31 and intersections of the third side wall 13, the fourth side wall 14, and the second bottom wall 32 may also form a sharp corner, that is, they may not be connected smoothly.

In this embodiment, the first side wall 11, the second side wall 12, the third side wall 13, and the fourth side wall 14 are all vertically connected to the first surface 1001.

An angle between the first side wall 11 and the second direction Y2 is defined as a first inclination angle θ1, an angle between the second side wall 12 and the second direction Y2 is defined as a second inclination angle θ2, an angle between the third side wall 13 and the second direction Y2 is defined as a third inclination angle θ3, an angle between the fourth side wall 14 and the second direction Y2 is defined as a fourth inclination angle θ4. θ1, θ2, θ3, and θ4 are all tilt angles of the first electrode 100.

Value ranges of θ1, θ2, θ3, and θ4 are all 3 degrees to 35 degrees. Preferably, the value ranges of θ1, θ2, θ3, and θ4 are all 5 degrees to 15 degrees.

Because the response time decreases with the increase of the electrode inclination angle, and the transmittance first increases and then decreases with the increase of the electrode inclination angle. Considering the relationship between the response time and the transmittance and the electrode inclination angle, the present application sets the value range of the first inclination angle to be between 3 degrees and 35 degrees. This can reduce the ineffective electric field component and the electric field disorder area while taking into account the corresponding time, reduce the area of the display dark area, and thus improve the transmittance.

In an optional embodiment of the present application, since the first side wall 11 and the third side wall 13 are left-right symmetrical, the θ1 is equal to the θ3.

In an optional embodiment of the present application, since the second side wall 12 and the fourth side wall 14 are bilaterally symmetrical, the θ2 is equal to the θ4.

Continuing to refer to FIG. 4, the solid part 10 further includes a fifth side wall 15 and a sixth side wall 16. The fifth side wall 15 is connected to the first surface 1001 and is connected to an end of the first side wall 11 away from the second side wall 12. The sixth side wall 16 is connected to the first surface 1001 and is connected to an end of the third side wall 13 away from the fourth side wall 14. That is, on the first surface 1001, the fifth side wall 15 and the first side wall 11 intersect at point C, and the sixth side wall 16 and the third side wall 13 are compared with point D. The fifth side wall 15 and the sixth side wall 16 constitute shoulders of the first electrode 100.

In this embodiment, the ends of the fifth side wall 15 and the sixth side wall 16 which are respectively away from the first side wall 11 and the third side wall 13 are inclined opposite to each other. That is, the distance from the end of the fifth side wall 15 away from the first side wall 11 to the end of the sixth side wall 16 away from the third side wall 13 is greater than the d2.

In this embodiment, the connection between the fifth side wall 15 and the first side wall 11 is a smooth connection. That is, the intersection of the fifth side wall 15 and the first side wall 11 does not form a sharp corner. The connection between the sixth side wall 16 and the third side wall 13 is a smooth connection. That is, the intersection of the sixth side wall 16 and the third side wall 13 does not form a sharp corner.

An included angle between the fifth side wall 15 and the second direction Y2 is defined as a fifth inclination angle β1. An included angle between the sixth side wall 16 and the second direction Y2 is defined as a sixth inclination angle β2. The value ranges of β1 and β2 are defined as 0 degrees and 90 degrees. Preferably, the value ranges of the 81 and the 82 are both 45 degrees to 60 degrees.

Setting the value ranges of β1 and β2 to be 0 degrees to 90 degrees can avoid dark domains caused by an excessively large angle between the fifth side wall 15 and the first side wall 11 (That is, it is avoided to form an oblique angle between the fifth side wall 15 and the first side wall 11, the existence of the oblique angle will generate a dark domain, and the dark domain will reduce the transmittance of the electrode). Thus, the loss of the transmittance of the first electrode 100 due to dark domains is avoided.

In an optional embodiment of the present application, β1 and β2 may satisfy: β=β2. Preferably, the fifth side wall 15 is symmetrical with the sixth side wall 16. Correspondingly, the fifth side wall 15 and the sixth side wall 16 may be left-right symmetrical or left-right asymmetrical. In this embodiment, the fifth side wall 15 and the sixth side wall 16 are left-right symmetrical. The left-right asymmetry here refers to refers to the asymmetry caused when the included angle between the connecting line of the ends of the fifth side wall 15 and the sixth side wall 16 away from the first side wall 11 and the third side wall 13 and the first direction Y1 is greater than 0.

In another embodiment of the present application, β1 and β2 may satisfy: (342. Correspondingly, the fifth side wall 15 and the sixth side wall 16 are left-right asymmetrical.

In an optional embodiment of the present application, the distance from ends of the fifth side wall 15 and the sixth side wall 16 away from the first side wall 11 and the third side wall 13 is greater than d2.

Continuing to refer to FIG. 4, the solid part 10 further includes a seventh side wall 17. The seventh side wall 17 is connected with the first surface 1001, the fifth side wall 15, and the sixth side wall 16 respectively. The seventh side wall 17 constitutes the head of the first electrode 100.

In this embodiment, the connection between the seventh side wall 17, the fifth side wall 15, and the sixth side wall 16 is a smooth connection. That is, the intersection of the seventh side wall 17 with the fifth side wall 15 and the sixth side wall 16 does not form a sharp corner.

In this embodiment, the seventh side wall 17 is a curved surface composed of three side walls. In other embodiments, the seventh side wall 17 may also be a plane composed of one side wall or a curved surface composed of two, three, or more side walls.

Continuing to refer to FIG. 4, the solid part 10 further includes an eighth side wall 18. The eighth side wall 18 is connected with the first surface 1001, the second side wall 12, and the fourth side wall 14, respectively. The seventh side wall 17 and the eighth side wall 18 are located at both ends of the solid part 10.

In this embodiment, the eighth side wall 18 may also be a plane composed of one side wall. In other embodiments, the eighth side wall 18 may also be a curved surface composed of at least two side walls.

In this embodiment, the connection between the eighth side wall 18, the second side wall 12, and the fourth side wall 14 is a smooth connection. That is, the intersection of the eighth side wall 18 with the second side wall 12 and the fourth side wall 14 does not form a sharp corner.

Continuing to refer to FIG. 4, the first electrode 100 further includes a connection terminal 19. The connection terminal 19 is formed on the solid part 10, and the connection terminal 19 serves as a signal output or input port of the first electrode 100. In this embodiment, the connection terminal 19 is located adjacent to the seventh side wall 17.

Figure 5:
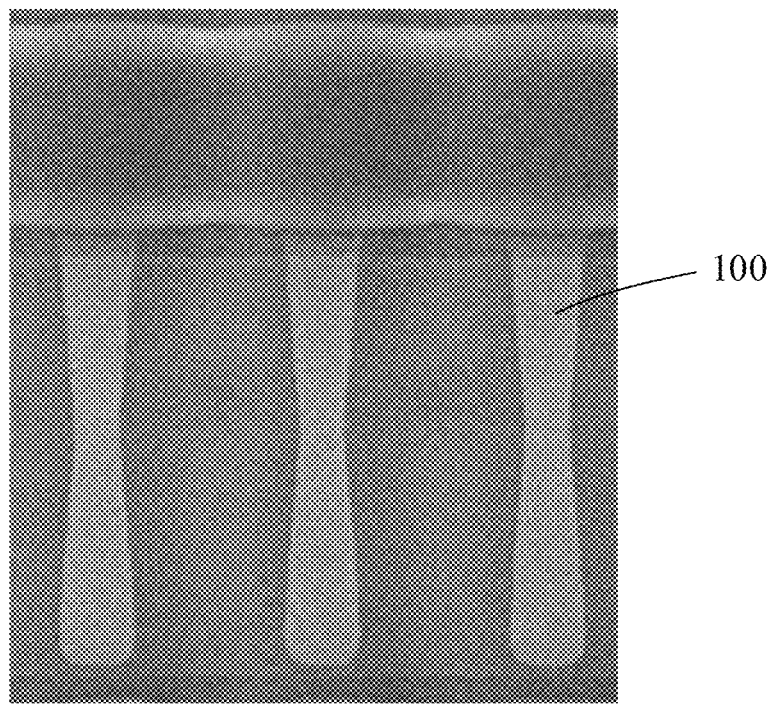
FIG. 5 is a real topography diagram of the electrode shown in FIG. 4.
Figure 6:
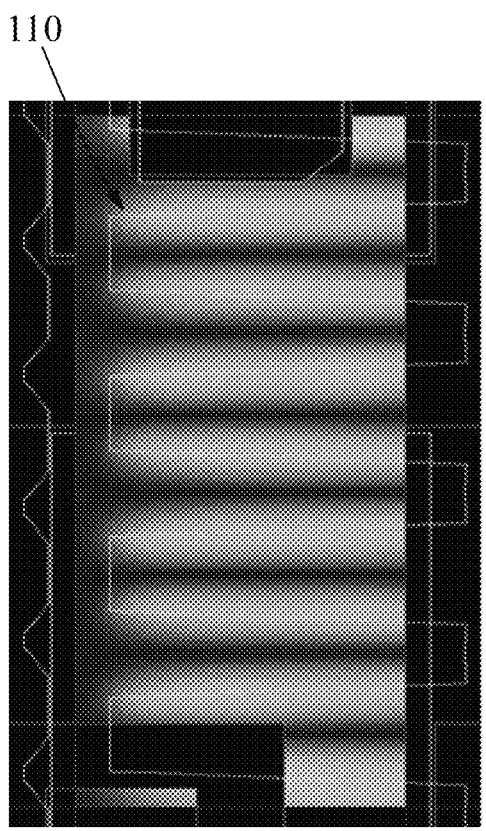
FIG. 6 is a simulated light effect diagram of a comb-shaped electrode in the prior art.
Figure 7:
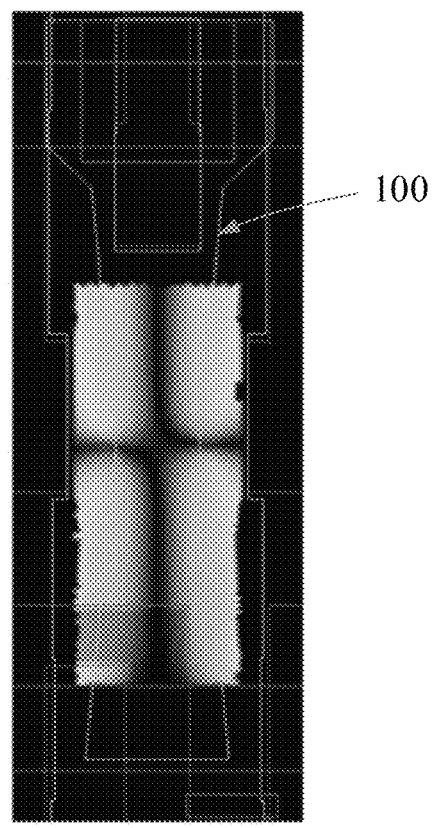
FIG. 7 is a simulated light effect diagram of the electrode shown in FIG. 4.

Referring to FIG. 5, FIG. 6, and FIG. 7, FIG. 5 is a real topography view of the electrode shown in FIG. 4. FIG. 6 is a simulated light effect diagram of a comb-shaped electrode in the prior art. FIG. 7 is a simulated light effect diagram of the electrode according to the present application. It can be seen from FIG. 6 and FIG. 7 that the light efficiency of the first electrode 100 provided by the present application shown in FIG. 7 is better than that of the comb-shaped electrode shown in FIG. 6. The transmittance of the first electrode 100 provided in the present application is higher than that of the comb-shaped electrode. Specifically, through simulation, it can be concluded that the light efficiency of the first electrode 100 provided by the present application is more than 50% better than that of the comb-shaped electrode in the prior art. That is, the transmittance of the first electrode 100 provided by the present application is higher than that of the comb-shaped electrode in the prior art.

Figure 8:
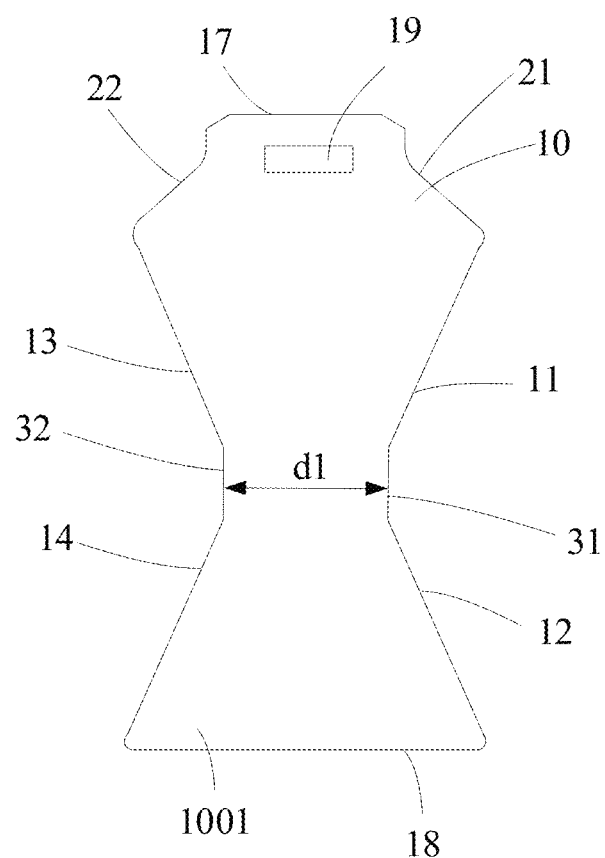
FIG. 8 is a top view of an electrode (pixel electrode) according to a second embodiment of the present application.

Referring to FIG. 8, the second embodiment of the present application further provides a first electrode 200. The structure of the first electrode 200 is similar to that of the first electrode 100, and the difference is only in that the distance from ends of the fifth side wall 21 and the sixth side wall 22 of the first electrode 200 away from the first side wall 11 and the third side wall 13 is less than the distance d2. That is, the fifth side wall 21 and the sixth side wall 22 of the first electrode 200 are inclined toward each other.

In this embodiment, the seventh side wall 17 of the first electrode 200 is a curved surface composed of five side walls.

It can be understood that in other embodiments, the distances between the ends of the fifth side wall 21 and the sixth side wall 22 of the first electrode 200 away from the first side wall 11 and the end of the third side wall 13 may also be It is equal to the d2, that is, the seventh side wall 17 of the first electrode 200 is flat.

Figure 9:
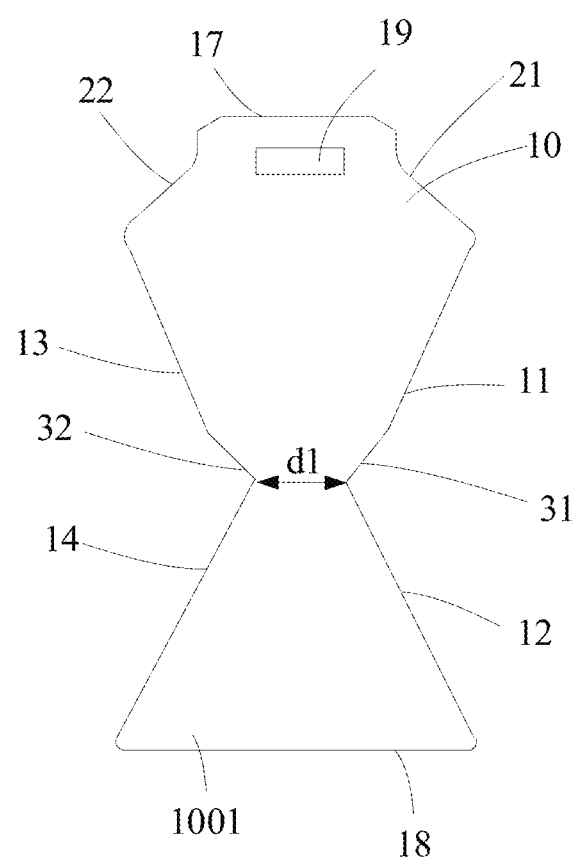
FIG. 9 is a top view of an electrode (pixel electrode) according to a third embodiment of the present application.

Referring to FIG. 9, the third embodiment of the present application further provides a first electrode 300. The structure of the first electrode 300 is similar to that of the first electrode 200, and the difference is only in that the first bottom wall 31 and the second bottom wall 32 of the first electrode 300 are not parallel, and neither the first bottom wall 31 nor the second bottom wall 32 extends along the second direction Y2.

In this embodiment, the ends of the first bottom wall 31 and the second bottom wall 32 of the first electrode 300 respectively connected to the second side wall 12 and the fourth side wall 14 are inclined toward each other. That is, the distance from the end of the first side wall 31 connected to the second wall 12 to the end of the second bottom wall 32 connected to the fourth side wall 14 is smaller than the distance from the end of the first bottom wall 31 connected with the first side wall 11 to the end of the second bottom wall 32 connected with the third side wall 13.

Figure 10:
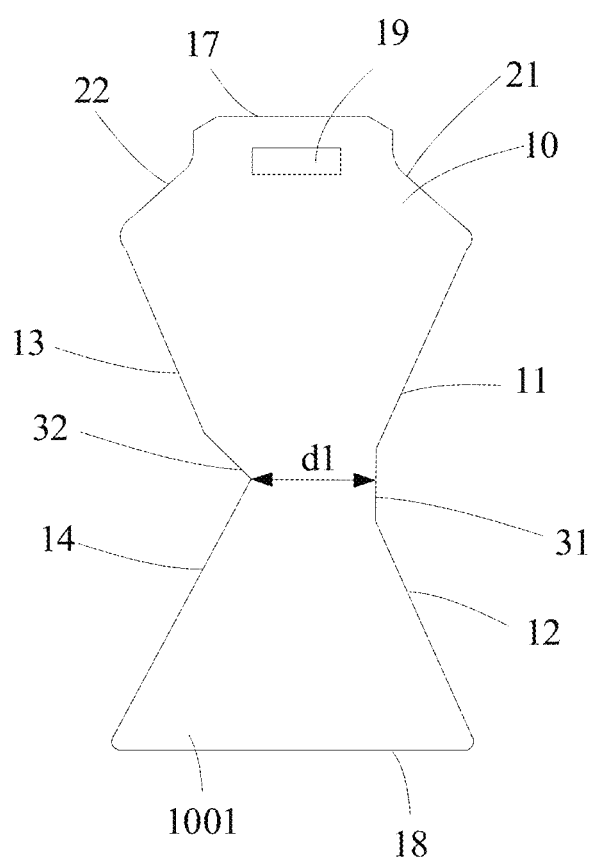
FIG. 10 is a top view of an electrode (pixel electrode) according to a fourth embodiment of the present application.

Referring to FIG. 10, the fourth embodiment of the present application further provides a first electrode 400. The structure of the first electrode 400 is similar to that of the second electrode 200, and the difference is only in that the first bottom wall 31 and the second bottom wall 32 of the first electrode 400 are not parallel. One of the first bottom wall 31 and the second bottom wall 32 does not extend along the second direction Y2, and the other extends along the second direction Y2.

Figure 11:
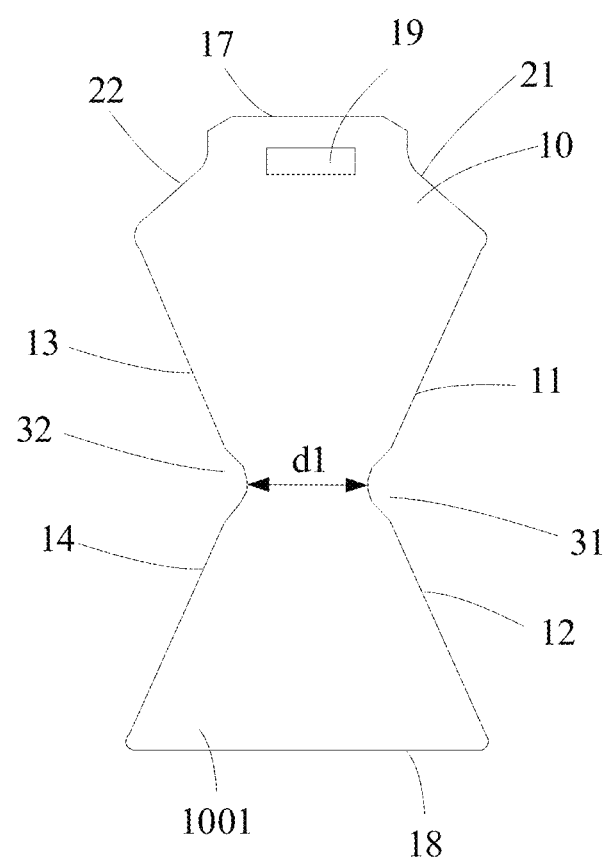
FIG. 11 is a top view of an electrode (pixel electrode) according to a fifth embodiment of the present application.

Referring to FIG. 11, the fifth embodiment of the present application further provides a first electrode 500. The structure of the first electrode 500 is similar to that of the second electrode 200, and the only difference is that the first bottom wall 31 and the second bottom wall 32 of the first electrode 500 are curved surfaces.

The curved surface may be a curved surface including at least two side walls, or may be an arc surface.

Figure 12:
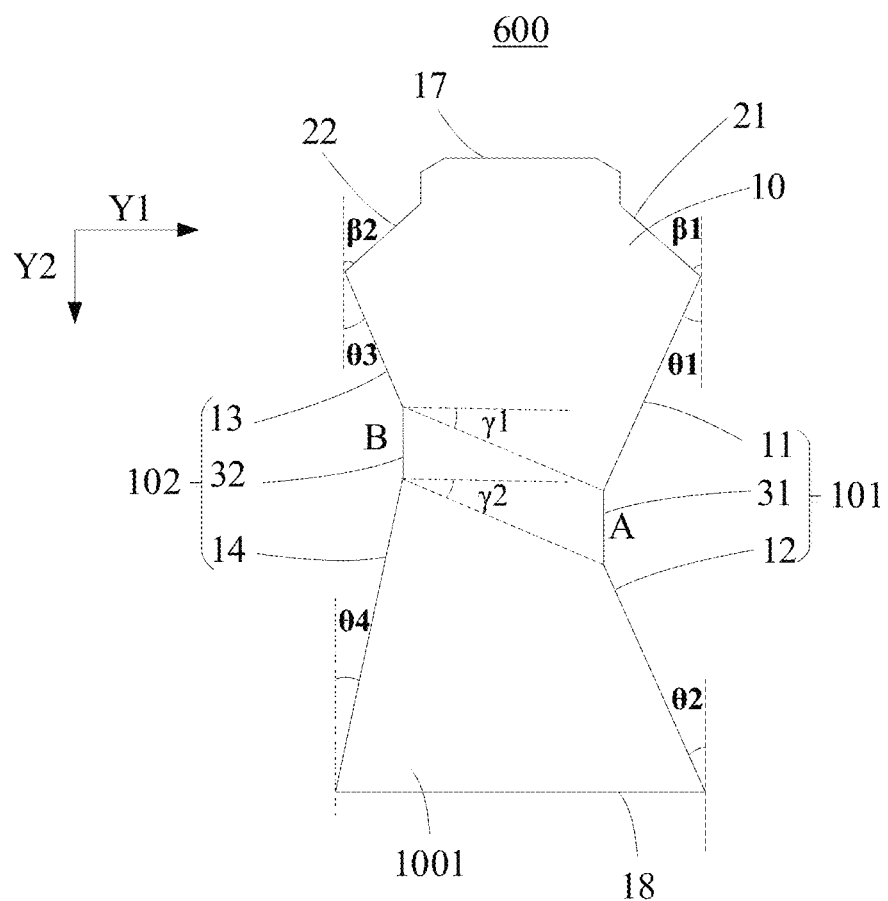
FIG. 12 is a top view of an electrode (pixel electrode) according to a sixth embodiment of the present application.

Referring to FIG. 12, the sixth embodiment of the present application further provides a first electrode 600. The structure of the first electrode 600 is similar to that of the second electrode 200, and the difference is only in that the angle between the connecting line between the end of the first side wall 11 connected to the first bottom wall 31 and the end of the third side wall 13 connected to the second bottom wall 32 and the first direction Y1 $\gamma1$ is greater than 0 degrees. That is, the first waist 1001 and the second waist 102 of the first electrode 600 are asymmetrical.

In this embodiment, the included angle $\gamma2$ between the connecting line between the end of the second side wall 12 connected to the first bottom wall 31 and the end of the fourth side wall 14 connected to the second bottom wall 32 and the first direction Y1 is greater than 0 degrees.

$\gamma2$ may or may not be equal to $\gamma1$. In this embodiment, $\gamma2$ is equal to $\gamma1$.

Because the first waist 1001 and the second waist 102 are asymmetrical, the first electrode 600 has a first set of inclination angles and a second set of inclination angles. This can not only increase the selectable range of the inclination angle of the first electrode 600, but also avoid the mutual interference region of liquid crystal rotation disorder, reduce dark domains, and improve transmittance.

It can be understood that the improvements involved in the sixth embodiment are also applicable to the first embodiment, the third embodiment, the fourth embodiment, and the fifth embodiment.

Figure 13:
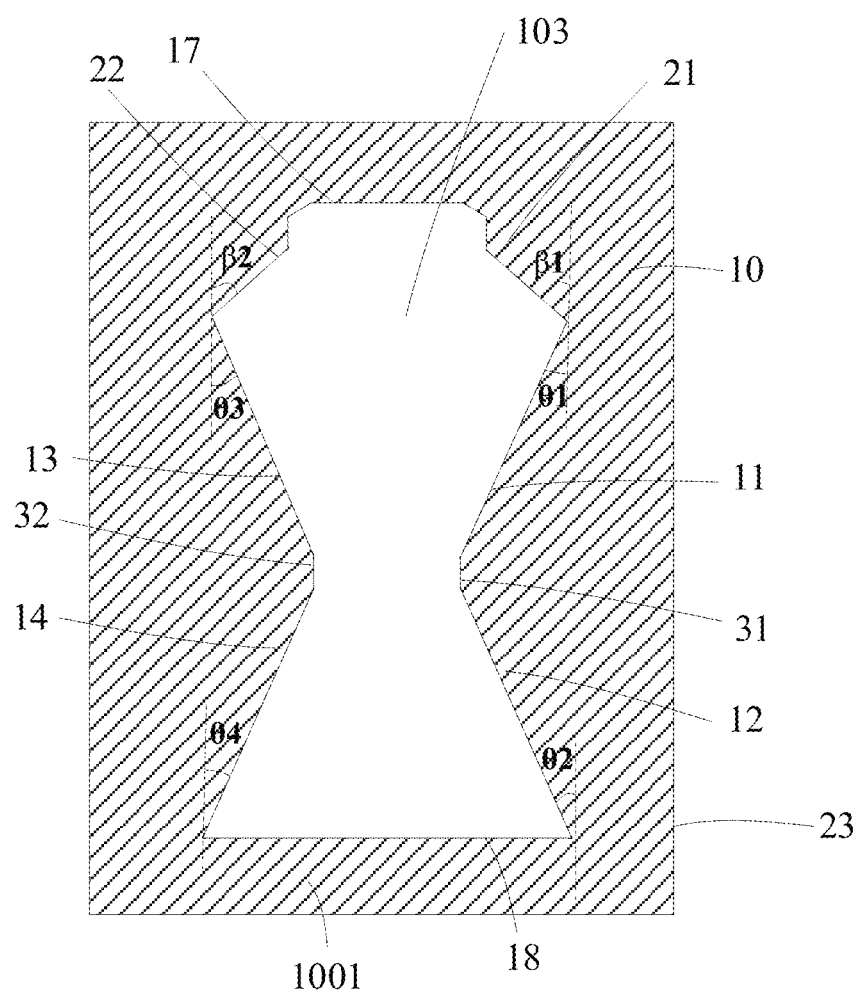
FIG. 13 is a top view of an electrode (common electrode) according to a seventh embodiment of the present application.

Referring to FIG. 13, the seventh embodiment of the present application further provides a first electrode 700. The structure of the first electrode 700 is similar to that of the first electrode 200, and the difference is only in that the first electrode 700 is a common electrode, and the first electrode 200 is a pixel electrode. A cavity 103 is formed in the solid part 10 of the first electrode 700. The first side wall 11, the second side wall 12, the third side wall 13, the fourth side wall 14, the first bottom wall 31, and the second bottom wall 32 are inner walls of the cavity. Preferably, the fifth side wall 15, the sixth side wall 16, the seventh side wall 17, and the eighth side wall 18 are also inner walls of the cavity 103. The solid part 10 of the first electrode 300 further includes an outer side wall 23. The outer side wall 23 surrounds the first side wall 11, the second side wall 12, the third side wall 13, the fourth side wall 14, the fifth side wall 15, and the sixth side wall 16, the seventh side wall 17, and the eighth side wall 18 are provided and are outer walls of the solid part 10.

In an optional embodiment of the present application, the cavity 103 is shaped like a fish.

Figure 14:
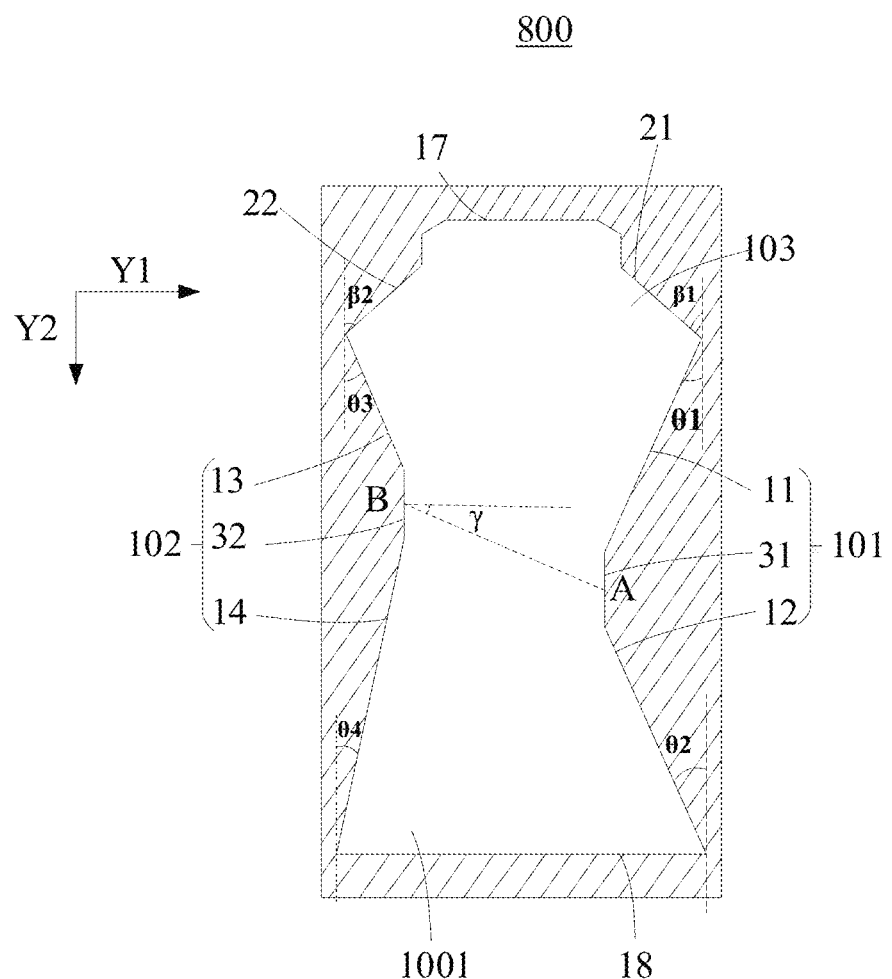
FIG. 14 is a top view of an electrode (common electrode) according to an eighth embodiment of the present application.

Referring to FIG. 14, the eighth embodiment of the present application further provides a first electrode 800. The structure of the first electrode 800 is similar to that of the first electrode 700, the difference is that the included angle $\gamma1$ between a connecting line of the first side wall 11 of the first electrode 800 connected to the first bottom wall 31 and the end of the third side wall 13 connected to the second bottom wall 32 and the first direction Y1 is greater than 0 degrees. That is, the first waist 1001 and the second waist 102 of the first electrode 800 are asymmetrical.

In this embodiment, the included angle $\gamma2$ between the connecting line between the end of the second side wall 12 connected to the first bottom wall 31 and the end of the fourth side wall 14 connected to the second bottom wall 32 and the first direction Y1 is greater than 0 degrees.

$\gamma2$ may or may not be equal to $\gamma1$. In this embodiment, $\gamma2$ is equal to $\gamma1$.

In an optional embodiment of the present application, the first side wall 11 is parallel to the fourth side wall 14. The second side wall 12 is parallel to the third side wall 13. $\theta1$ and $\theta4$ are the first set of tilt angles of the first electrode 100. $\theta2$ and $\theta3$ are the second set of tilt angles of the first electrode 100. $\theta1$, $\theta2$, $\theta3$, and $\theta4$ satisfy: $\theta1=\theta4$ and $\theta2=\theta3$. Further, $\theta1$ may or may not be equal to $\theta2$, and $\theta3$ may or may not be equal to $\theta4$.

Because the first waist 1001 and the second waist 102 are asymmetrical, the first electrode 800 has a first set of inclination angles and a second set of inclination angles. This can not only increase the selectable range of the inclination angle of the first electrode 800, but also avoid the mutual interference region of liquid crystal rotation disorder, reduce dark domains, and improve transmittance.

It can be understood that the present application also provides the shape of the inner wall of the cavity and the first electrodes (common electrodes) with the same outer wall shapes of the first electrodes in embodiment 1, embodiment 3, embodiment 4, and embodiment 5, which will not be repeated here.

In the array substrate, liquid crystal display panel and display device provided by the present application, 1) the shape of the first electrode is designed to have a first waist (composed of a first side wall, a second side wall, and a first bottom wall) and a second waist (composed of the third side wall, the fourth side wall, and the second bottom wall). The shortest distance from the first waist to the second waist is smaller than the distance from the end of the first side wall away from the second side wall to the end of the third side wall away from the fourth side wall and is smaller than the distance from the end of the second side wall away from the first side wall to the end of the fourth side wall away from the third side wall, so as to obtain a fish-like electrode. By changing the shape of the first electrode, the inactive electric field component and the electric field disorder area can be reduced, thereby reducing the area of the display dark area. Thus, the transmittance is improved while taking into account the response time. 2) The included angle between the connecting line of the end of the first side wall close to the second side wall and the end of the third side wall close to the fourth side wall and the first direction is greater than 0 degrees. This makes the first waist asymmetrical with the second waist. This can not only increase the selectable range of the inclination angle of the first electrode, but also avoid the mutual interference area of liquid crystal rotation disorder, reduce dark domains, and improve transmittance. 3) The response time decreases with the increase of the electrode inclination angle and the transmittance first increases and then decreases with the increase of the electrode inclination angle. Therefore, setting the value of the inclination angle of the first electrode between 3 degrees and 35 degrees can not only improve the transmittance of the display panel, but also have a better response time. This meets the needs of VR display devices. 4) When the first electrode provided in the present application is a pixel electrode, the waist of the electrode shrinks. Thus, the distance between two adjacent electrodes is increased, thereby reducing the risk of cross-linking of adjacent electrodes during the exposure and development process.

To sum up, although the present application has disclosed the above-mentioned preferred embodiments, the above-mentioned preferred embodiments are not intended to limit the present application. Those skilled in the art can make various changes and modifications without departing from the spirit and scope of the present application. Therefore, the protection scope of the present application is subject to the scope defined by the claims.

What is claimed is:

1. An array substrate, comprising:
   a driving circuit layer and a first electrode located on the driving circuit layer; wherein the driving circuit layer comprises a plurality of scan lines and a plurality of data lines; wherein an extension direction of the scan lines is defined as a first direction, and an extension direction of the data lines as a second direction, the second direction is perpendicular to the first direction; wherein the first electrode further comprises a solid part; wherein the solid part further comprises:
   a first side wall, a second side wall, and a first bottom wall; an end of the first side wall and an end of the second side wall are connected by the first bottom wall; and
   a third side wall, a fourth side wall, and a second bottom wall; an end of the third side wall and an end of the fourth side wall are connected by the second bottom wall;
   wherein a connecting line from an end of the first side wall away from the second side wall to an end of the third side wall away from the fourth side wall and a connecting line from an end of the second side wall away from the first side wall to an end of the fourth side wall away from the third side wall extends along the first direction;
   wherein a shortest distance from the first bottom wall to the second bottom wall is defined as d1, a distance from the end of the first side wall away from the second side wall to the end of the third side wall away from the fourth side wall is defined as d2, a distance from the end of the second side wall away from the first side wall to the end of the fourth side wall away from the third side wall is defined as d3, and d1<d2 and d1<d3;
   wherein a plurality of sub-pixel areas are surrounded by the plurality of scan lines and the plurality of data lines, the first electrode is located in the sub-pixel area;
   wherein the solid part of the first electrode comprises two opposite trapezoidal electrode portions, an intermediate connection portion, and a cap electrode portion, each of the trapezoidal electrode portions comprises a narrow base and a broad base opposite to the narrow base, the narrow bases of the trapezoidal electrode portions face each other, the intermediate connection portion is formed between and connected to the narrow bases of the trapezoidal electrode portions, the cap electrode portion is formed on the broad base of one of the trapezoidal electrode portions, the broad base of the other of the trapezoidal electrode portions is a free distal end of the solid part, and a width of the cap electrode portion is greater of a width of each of the trapezoidal electrode portions and a width of the intermediate connection portion.

2. The array substrate according to claim 1, wherein the first electrode further comprises a cavity located in the solid part, the first side wall, the second side wall, the third side wall, the fourth side wall, the first bottom wall, and the second bottom wall are inner walls of the cavity.

3. The array substrate according to claim 2, wherein the solid part further comprises an outer side wall, the outer side wall is arranged around the first side wall, the second side wall, the third side wall, and the fourth side wall, and the outer side wall is the outer wall of the solid part.

4. The array substrate according to claim 2, wherein the first electrode is a common electrode.

5. The array substrate according to claim 1, wherein the first electrode is a pixel electrode.

6. The array substrate according to claim 1, wherein an angle between the connecting line between the end of the first side wall connected to the first bottom wall and the end of the third side wall connected to the second bottom wall and the first direction is greater than 0 degrees.

7. The array substrate according to claim 1, wherein an angle between the first side wall and the second direction is defined as a first inclination angle $\theta1$, an angle between the second side wall and the second direction is defined as a second inclination angle $\theta2$, an angle between the third side wall and the second direction is defined as a third inclination angle $\theta3$, an angle between the fourth side wall and the second direction is defined as a fourth inclination angle $\theta4$, and value ranges of $\theta1$, $\theta2$, $\theta3$, and $\theta4$ are all 3 degrees to 35 degrees.

8. The array substrate according to claim 7, wherein the value ranges of $\theta1$, $\theta2$, $\theta3$, and $\theta4$ are all 5 degrees to 15 degrees.

9. The array substrate according to claim 7, wherein the first side wall is parallel to the fourth side wall, and the second side wall is parallel to the third side wall; $\theta1$ and $\theta4$ are the first inclination angles of the first electrode, $\theta2$ and $\theta3$ are the second inclination angles of the first electrode; $\theta1$, $\theta2$, $\theta3$, and $\theta4$ satisfy: $\theta1=\theta4$ and $\theta2=\theta3$.

10. The array substrate according to claim 9, wherein $\theta1$ is equal to or not equal to $\theta2$, and $\theta3$ is equal to or not equal to $\theta4$.

11. The array substrate according to claim 7, wherein $\theta1 \neq \theta2$ and $\theta3 \neq \theta4$.

12. The array substrate according to claim 7, wherein the solid part further comprises:
   a first bottom wall, wherein two ends of the first bottom wall are respectively connected with the first side wall and the second side wall; and
   a second bottom wall, wherein two ends of the second bottom wall are respectively connected with the third side wall and the fourth side wall.

13. The array substrate according to claim 12, wherein the first bottom wall and the second bottom wall are both planes parallel to the second direction or not parallel to the second direction.

14. The array substrate according to claim 12, wherein the first bottom wall and the second bottom wall are both curved surfaces.

15. The array substrate according to claim 1, wherein the solid part further comprises:
- a fifth side wall connected to the end of the first side wall away from the second side wall; and
- a sixth side wall, connected to the end of the third side wall away from the fourth side wall;
- an angle between the fifth side wall and the second direction is defined as a fifth inclination angle β1, an angle between the sixth side wall and the second direction is a sixth inclination angle β2, and value ranges of β1 and β2 are both 0 degrees to 90 degrees.

16. The array substrate according to claim 15, wherein the value ranges of β1 and β2 are both 45 degrees to 60 degrees.

17. The array substrate according to claim 15, wherein the solid part further comprises:
- a seventh side wall connected to the fifth side wall and the sixth side wall, respectively; and
- an eighth side wall connected to the second side wall and the fourth side wall, respectively;
- wherein the eighth side wall and the seventh side wall are located at two ends of the solid part.

18. The array substrate according to claim 1, wherein the array substrate further comprises a substrate and a second electrode opposite to the first electrode, the second electrode is located within the driving circuit layer or on the driving circuit layer, the driving circuit layer is located on the substrate, and the second electrode is located between the substrate and the first electrode.

19. A liquid crystal display panel, comprising:
- liquid crystal and a color filter substrate, wherein the liquid crystal display panel further comprises an array substrate, and the liquid crystal is located between the color filter substrate and the array substrate; wherein the array substrate comprises a driving circuit layer and a first electrode located on the driving circuit layer; wherein the driving circuit layer comprises a plurality of scan lines and a plurality of data lines; wherein an extension direction of the scan lines is defined as a first direction, and an extension direction of the data lines as a second direction, the second direction is perpendicular to the first direction; wherein the first electrode further comprises a solid part; wherein the solid part further comprises:
- a first side wall, a second side wall, and a first bottom wall; an end of the first side wall and an end of the second side wall are connected by the first bottom wall; and
- a third side wall, a fourth side wall, and a second bottom wall; an end of the third side wall and an end of the fourth side wall are connected by the second bottom wall;
- wherein a connecting line from an end of the first side wall away from the second side wall to an end of the third side wall away from the fourth side wall and a connecting line from an end of the second side wall away from the first side wall to an end of the fourth side wall away from the third side wall extends along the first direction;
- wherein a shortest distance from the first bottom wall to the second bottom wall is defined as d1, a distance from the end of the first side wall away from the second side wall to the end of the third side wall away from the fourth side wall is defined as d2, a distance from the end of the second side wall away from the first side wall to the end of the fourth side wall away from the third side wall is defined as d3, and d1<d2 and d1<d3;
- wherein a plurality of sub-pixel areas are surrounded by the plurality of scan lines and the plurality of data lines, the first electrode is located in the sub-pixel area;
- wherein the solid part of the first electrode comprises two opposite trapezoidal electrode portions, an intermediate connection portion, and a cap electrode portion, each of the trapezoidal electrode portions comprises a narrow base and a broad base opposite to the narrow base, the narrow bases of the trapezoidal electrode portions face each other, the intermediate connection portion is formed between and connected to the narrow bases of the trapezoidal electrode portions, the cap electrode portion is formed on the broad base of one of the trapezoidal electrode portions, the broad base of the other of the trapezoidal electrode portions is a free distal end of the solid part, and a width of the cap electrode portion is greater of a width of each of the trapezoidal electrode portions and a width of the intermediate connection portion.

20. A display device, comprising:
- a liquid crystal display panel, wherein the liquid crystal display panel comprises liquid crystal and a color filter substrate, wherein the liquid crystal display panel further comprises an array substrate, and the liquid crystal is located between the color filter substrate and the array substrate; wherein the array substrate comprises a driving circuit layer and a first electrode located on the driving circuit layer; wherein the driving circuit layer comprises a plurality of scan lines and a plurality of data lines; wherein an extension direction of the scan lines is defined as a first direction, and an extension direction of the data lines as a second direction, the second direction is perpendicular to the first direction; wherein the first electrode further comprises a solid part; wherein the solid part further comprises:
- a first side wall, a second side wall, and a first bottom wall; an end of the first side wall and an end of the second side wall are connected by the first bottom wall; and
- a third side wall, a fourth side wall, and a second bottom wall; an end of the third side wall and an end of the fourth side wall are connected by the second bottom wall;
- wherein a connecting line from an end of the first side wall away from the second side wall to an end of the third side wall away from the fourth side wall and a connecting line from an end of the second side wall away from the first side wall to an end of the fourth side wall away from the third side wall extends along the first direction;
- wherein a shortest distance from the first bottom wall to the second bottom wall is defined as d1, a distance from the end of the first side wall away from the second side wall to the end of the third side wall away from the fourth side wall is defined as d2, a distance from the end of the second side wall away from the first side wall to the end of the fourth side wall away from the third side wall is defined as d3, and d1<d2 and d1<d3;
- wherein a plurality of sub-pixel areas are surrounded by the plurality of scan lines and the plurality of data lines, the first electrode is located in the sub-pixel area;
- wherein the solid part of the first electrode comprises two opposite trapezoidal electrode portions, an intermediate connection portion, and a cap electrode portion, each of the trapezoidal electrode portions comprises a narrow base and a broad base opposite to the narrow base, the narrow bases of the trapezoidal electrode portions face each other, the intermediate connection portion is formed between and connected to the narrow bases of the trapezoidal electrode portions, the cap electrode portion is formed on the broad base of one of the trapezoidal electrode portions, the broad base of the other of the trapezoidal electrode portions is a free distal end of the solid part, and a width of the cap electrode portion is greater of a width of each of the trapezoidal electrode portions and a width of the intermediate connection portion.

* * * * *